United States Patent [19]

Lannes

[11] Patent Number: 5,485,879
[45] Date of Patent: * Jan. 23, 1996

[54] COMBINED WATER HEATER AND HEAT EXCHANGER

[75] Inventor: Eric M. Lannes, Kentwood, Mich.

[73] Assignee: Bradford White Corporation, Ambler, Pa.

[*] Notice: The portion of the term of this patent subsequent to Dec. 13, 2011, has been disclaimed.

[21] Appl. No.: 225,177

[22] Filed: Apr. 8, 1994

Related U.S. Application Data

[63] Continuation-in-part of Ser. No. 84,406, Jun. 29, 1993, Pat. No. 5,372,185.

[51] Int. Cl.$^6$ .............................. F24D 3/08; F28F 11/00
[52] U.S. Cl. .............................. 165/70; 122/14; 122/17; 165/140; 237/19
[58] Field of Search .......................... 392/451, 479–481; 248/68.1; 165/70, 140; 122/17, 14; 237/19

[56] References Cited

U.S. PATENT DOCUMENTS

| | | |
|---|---|---|
| 1,070,175 | 8/1913 | Ponninghaus . |
| 1,240,101 | 9/1917 | Thompson . |
| 1,255,835 | 2/1918 | Shaug . |
| 1,959,933 | 5/1934 | Simsohn . |
| 2,252,046 | 8/1941 | Steele . |
| 2,255,956 | 9/1941 | Watt . |
| 2,303,197 | 11/1942 | Canfield . |
| 2,327,339 | 8/1943 | Chandler . |
| 2,345,209 | 3/1944 | Moore . |
| 2,348,610 | 5/1944 | Colby . |
| 2,348,835 | 5/1944 | Mueller . |
| 2,359,547 | 10/1944 | Colby . |
| 2,373,731 | 4/1945 | Wilson et al. . |
| 2,399,985 | 5/1946 | Chandler . |
| 2,533,508 | 12/1950 | Riu . |
| 2,539,469 | 1/1951 | Powers . |
| 2,569,757 | 10/1951 | Gubson . |
| 2,642,046 | 6/1953 | Alexander . |
| 2,704,188 | 3/1955 | Bergmann . |
| 3,171,597 | 3/1965 | Baier . |
| 3,201,045 | 8/1965 | Davidson et al. . |
| 3,254,839 | 6/1966 | McClanahan et al. . |
| 3,341,122 | 9/1967 | Whittell, Jr. . |
| 3,793,992 | 2/1974 | Marquez . |
| 3,828,847 | 8/1974 | Stein . |
| 3,896,992 | 7/1975 | Borovina . |
| 3,958,755 | 5/1976 | Cleer, Jr. . |
| 4,037,785 | 7/1977 | Madern . |
| 4,052,000 | 10/1977 | Honikman . |
| 4,149,673 | 4/1979 | Hapgood . |
| 4,158,438 | 6/1979 | Hapgood . |
| 4,238,873 | 12/1980 | Frank et al. . |
| 4,253,446 | 3/1981 | Miller . |
| 4,267,826 | 5/1981 | Hitt, Jr. . |
| 4,282,861 | 8/1981 | Roark . |
| 4,296,799 | 10/1981 | Steele . |
| 4,309,982 | 1/1982 | Oquidam . |

(List continued on next page.)

FOREIGN PATENT DOCUMENTS

| | | |
|---|---|---|
| 2412807 | 8/1979 | France . |
| 2469667 | 5/1981 | France . |
| 2430825 | 1/1976 | Germany . |
| 3906715 | 9/1990 | Germany . |

Primary Examiner—William E. Tapolcai
Attorney, Agent, or Firm—Miller & Christenbury

[57] ABSTRACT

A system for heating two independent water supplies having a water storage tank adapted to contain a first, potable water supply and a coiled heat exchange tube mounted within the tank to contain and conduct a second, non-potable water supply. The tank has a top, bottom, wall, and flue communicating between the top and bottom. The tube is in communication with the exterior of the tank and with a circulatory space heating system. The tube has a double wall to protect against the mixing of the potable and non-potable water supplies, and the ends of the tube terminate at the surface of the water storage tank at a dielectric fitting which maintains electrical isolation between dissimilar metals otherwise exposed to the water.

24 Claims, 10 Drawing Sheets

U.S. PATENT DOCUMENTS

| | | |
|---|---|---|
| 4,345,583 | 8/1982 | Morin . |
| 4,461,347 | 7/1984 | Layton et al. . |
| 4,480,631 | 11/1984 | Kristensen . |
| 4,545,365 | 10/1985 | Wetzel, Jr. . |
| 4,637,347 | 1/1987 | Troy . |
| 4,738,394 | 4/1988 | Ripka et al. . |
| 4,821,682 | 4/1989 | Waters . |
| 4,949,680 | 8/1990 | Kale . |
| 5,037,510 | 8/1991 | Nygards . |
| 5,081,696 | 1/1992 | Beck ............................ 392/451 X |
| 5,224,674 | 7/1993 | Simons ............................ 248/68.1 |
| 5,228,413 | 7/1993 | Tam . |
| 5,372,185 | 12/1994 | Lannes ............................ 165/70 |

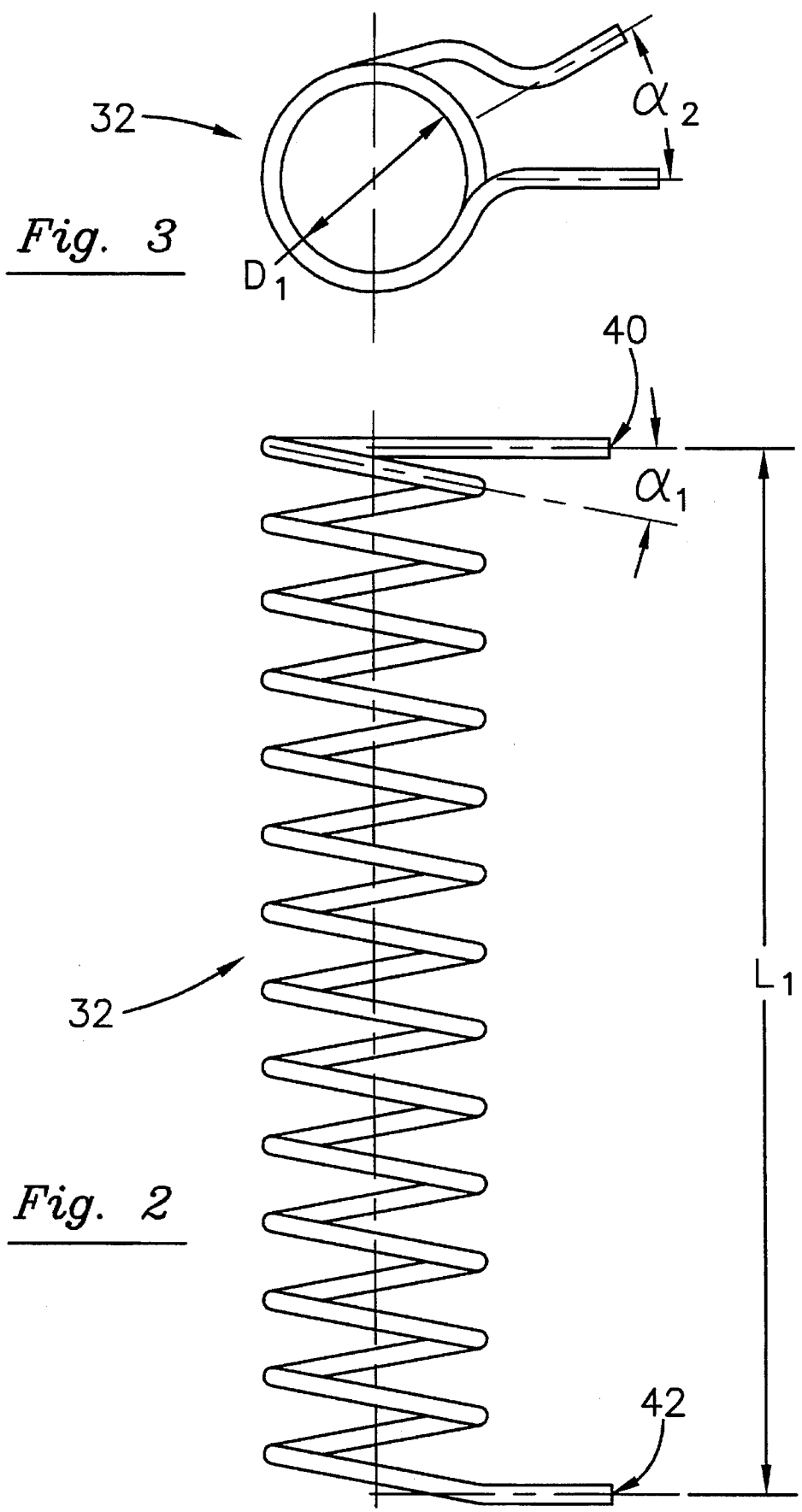

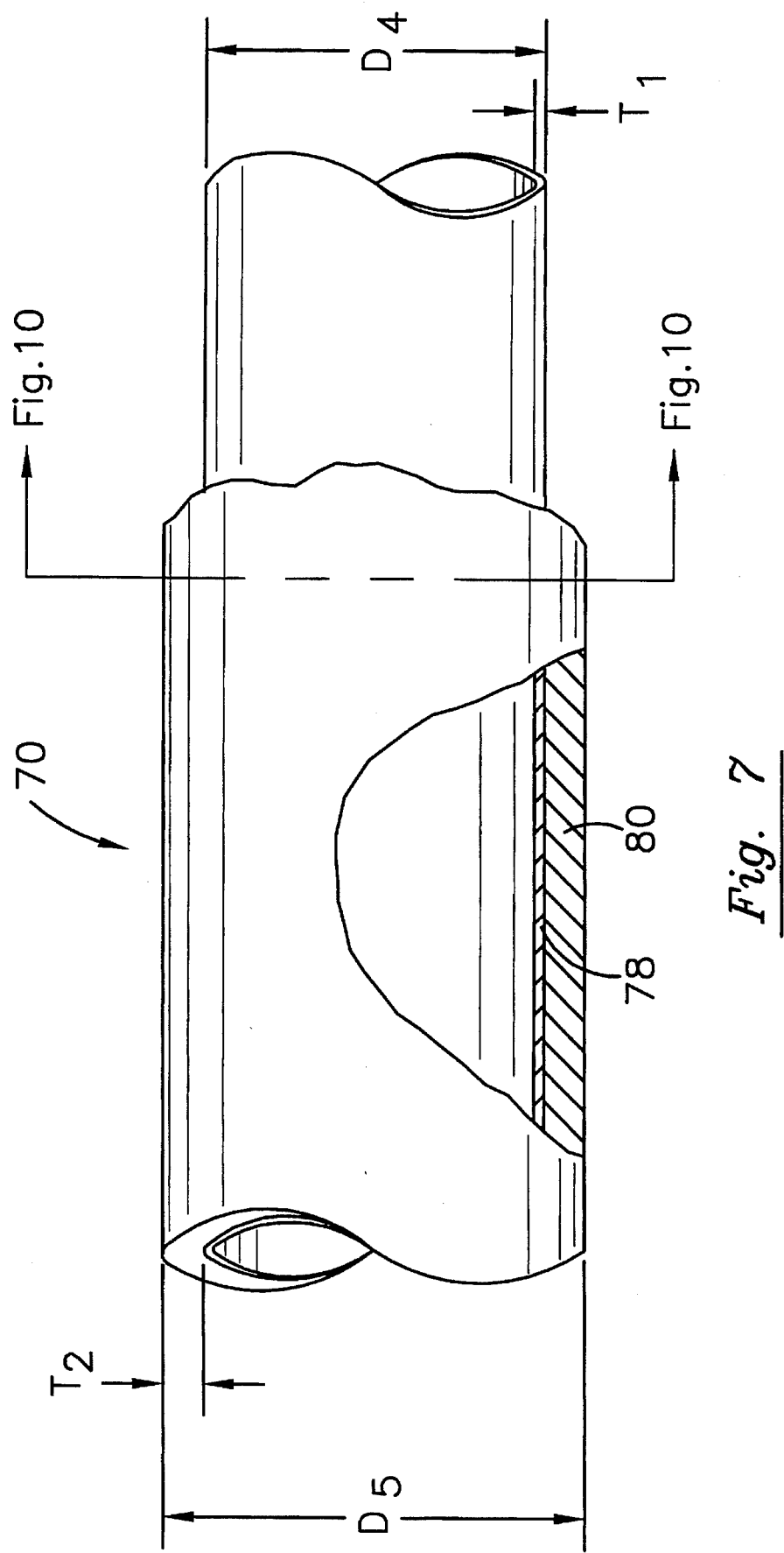

COMBINED WATER HEATER AND HEAT EXCHANGER

RELATED APPLICATION

This is a continuation-in-part of application Ser. No. 08/084,406, filed Jun. 29, 1993, now U.S. Pat. No. 5,372, 185.

BACKGROUND OF THE INVENTION

This invention relates to a combined water heating system for domestic or commercial use which is capable of heating water for consumption as well as for space heating. The system heats potable water for consumption while exchanging heat to a recycling fluid-based space heating system. The combined water heating system provides this function while maintaining separation between the potable and non-potable water supplies.

FIELD OF THE INVENTION

There has long been a need for compact appliances to be installed within living areas in single and multi-family dwellings as well as in commercial establishments. Stackable washer and dryer units, combination cooktop and oven units, and other compact appliances have been developed to satisfy this need.

Several attempts have been made to provide a combined water and space heating appliance to satisfy the need for a compact system for supplying hot water. For example, U.S. Pat. No. 1,070,175, issued to Ponninghaus, discloses a boiler having a coil to conduct water to be used for such purposes as heating rooms or the like. The '175 system, however, cannot be used with a standard glass-lined water heater system, and degradation of the '175 system may lead to the mixing of potable and non-potable water supplies. These drawbacks are also inherent in U.S. Pat. Nos. 2,704,188; 3,793,992; and 3,828,847.

All traditional combined water heating systems exhibit one or more of several critical shortcomings. The lack of protection against the mixing of potable and non-potable water creates a significant hazard to consumers of water heated in such systems. Moreover, traditional combined water heating systems accelerate the decay of the water heater system, thereby increasing maintenance requirements and reducing the cost effectiveness of such systems. Traditional combined water heating system designs are also inappropriate for use with standard glass-lined water heaters. Lastly, traditional combined water heating systems are inefficient and are not capable of practical use.

Accordingly, there is a long-standing and thus far unsatisfied need for a compact, inexpensive and efficient water heater system capable of providing hot potable water simultaneously with heated water for space heating.

OBJECTS OF THE INVENTION

It is an object of this invention to provide a combined water heating system for domestic or commercial use capable of heating water for consumption as well as for space heating.

It is another object of this invention to provide a combined water heating system that is compact in size so as to be useful for both residential and commercial use.

It is another object of this invention to provide a combined water heating system that utilizes standard glass-lined, direct-fired or electric water heaters.

It is still another object of this invention to provide a combined water heating system which prevents the mixing of potable and non-potable water supplies.

It is a further object of this invention to provide a combined water heating system with a dual heating capability without degrading water heater performance or compromising water heater longevity.

It is another object of this invention to provide a combined water heating system utilizing a dielectric fitting to prevent the exposure of dissimilar metals to water and the accelerated corrosion associated therewith.

Finally, another object of this invention is to provide a combined water heating system characterized by both low manufacturing costs and maintenance costs.

Other objects and advantages of the present invention will become apparent to those skilled in the art from the drawings, the detailed description of preferred embodiments and the appended claims.

SUMMARY OF THE INVENTION

The combined water heating system comprises a heat exchanger incorporated into a standard, glass-lined water heater system which preferably utilizes a direct-firing burner and a flue to heat potable water for domestic consumption. The heat exchanger has a coiled construction which surrounds the water heater flue, entering and exiting the water heater water storage tank through the wall, top and/or bottom of the water storage tank. The heat exchanger coil passes through and is substantially submerged in the potable water contained within the water heater tank so that heat is transferred for remote space heating. The heat exchanger coil has a quantity of coils based on the space heating load of the heating system.

The heat exchanger coil has a double-wall construction, having a non-metallic outer wall surrounding a metallic inner wall. The double-wall construction protects the potable water supply frown contamination. If either the inner or outer wall leaks, the potable system will not be contaminated by the recycling space heater water supply. The non-metallic outer wall also permits dielectric mounting of the heat exchanger coil within the glass-lined water storage tank to prevent the accelerated corrosion which occurs when water is exposed to dissimilar metals. The inner wall's metallic construction provides increased heat transfer by increasing conductive heat transfer. The inner wall also provides strength to, and facilitates the formation of, the heat exchanger coil.

BRIEF DESCRIPTION OF THE DRAWINGS

FIG. 2 shows a side view of the coiled heat exchange tube used in the combined water heating system shown in FIG. 1.

FIG. 3 shows a top view of the coiled heat exchange tube used in the combined water heating system shown in FIG. 1.

FIG. 7 shows a side view of a portion of the heat exchange tube with a cut-away cross-sectional view of the coiled heat exchange tube's double-wall construction.

DETAILED DESCRIPTION OF THE INVENTION

Figure 1:
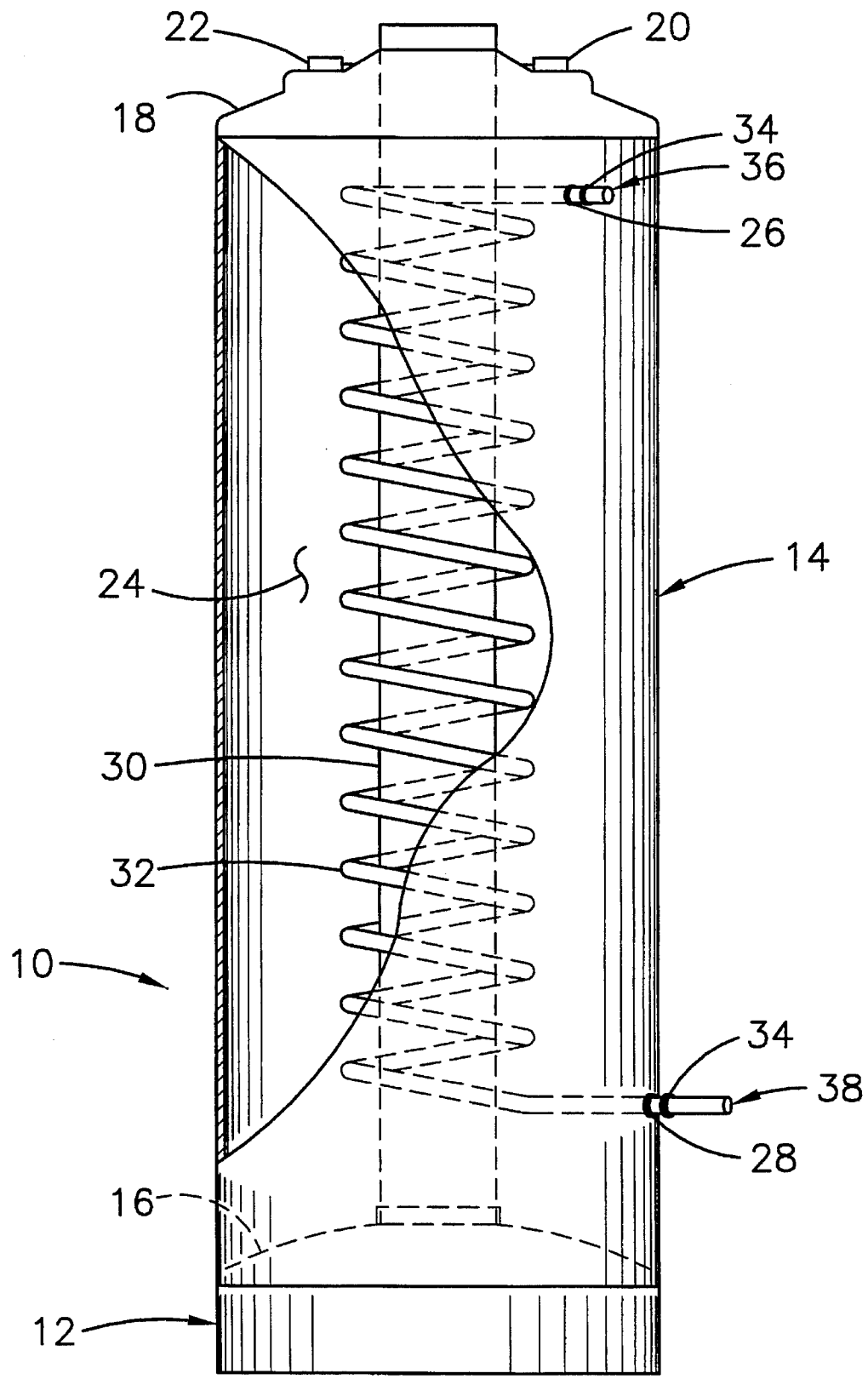
FIG. 1 shows a side view of one embodiment of the combined water heating system with a portion of the water storage tank wall removed.

The following description is intended to refer to the specific embodiments of this invention that are illustrated in the drawings. This description is not intended to define or limit the scope of the invention, which is defined separately in the claims that follow.

Referring to FIG. 1, the number 10 designates one embodiment of the combined water heating system. The combined water heating system 10 has a heat source 12 which heats potable water contained within a glass-lined water storage tank 14. The heat source 12 is preferably a direct-fired burner of the type traditionally used in standard water heaters. Although oil, gas or other fuels are contemplated for heat source 12, heat source 12 is most preferably a direct-fired gas burner. The water storage tank 14 has a bottom 16, top 18 and wall 24. The water storage tank top 18 has a cold water inlet port 20 through which water is introduced into the water storage tank 14. A hot water outlet port 22 is also provided in the water storage tank top 18 so that hot water may be drawn from the water storage tank 14 for consumption. The wall 24 of the water storage tank 14 has a tank outlet port 26 in the top portion of the wall 24, and a tank inlet port 28 located toward the bottom of the wall 24.

A flue 30 runs between the water storage tank bottom 16 and the water storage tank top 18 to provide for the exhaust of combustion gases from the heat source 12. A coiled heat exchange tube 32 is mounted within the glass-lined water storage tank 14 so that it surrounds the flue 30. The coiled heat exchange tube 32 terminates at a dielectric fitting assembly 34 at the tank outlet port 26 and also at a dielectric fitting assembly 34 located at the tank inlet port 28. Pipe section 36 runs from the dielectric fitting assembly 34 at the tank outlet port 26 to a space heating system, and pipe section 38 runs from the space heating system to the combined water heating system, terminating at the dielectric fitting assembly 34 located at the tank inlet port 28.

The combined water heating system embodiment shown in FIG. 1 utilizes a direct-fired burner to heat the water in the storage tank. However, an electric water heating system can also be used. An electric system would have one or more heating elements extending into the storage tank, eliminating the need for the direct-fired burner or combustion gas flue of direct-fired water heaters. Such an electric water heating system is described below with reference to FIG. 12.

Referring to FIG. 2, the coiled heat exchange tube 32 has a plurality of coils inclined at an angle of incline $\alpha_1$. The coiled heat exchange tube 32 has an overall length $L_1$, and terminates at an outlet portion 40 and an inlet portion 42. FIG. 3 illustrates the coiled heat exchange tube 32 as viewed from the top. The coiled heat exchange tube 32 has a coiled inner diameter $D_1$ larger than the diameter of the flue 30 shown in FIG. 1. The outlet portion 40 and inlet portion 42 of the coiled heat exchange tube 32 shown in FIG. 2 are radially separated by an angle $\alpha_2$ shown in FIG. 3.

Figure 4:
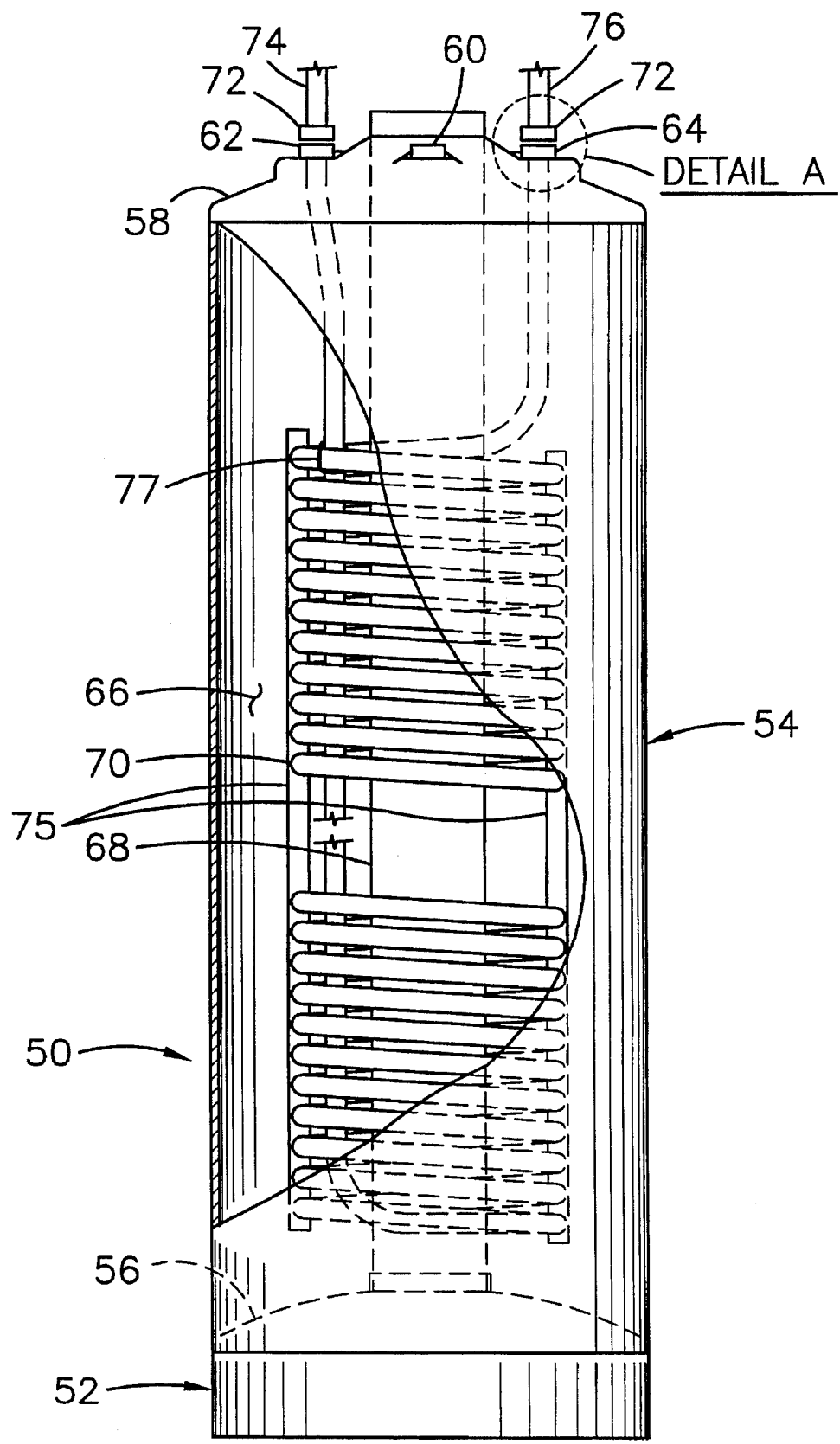
FIG. 4 shows a side view of another embodiment of the combined water heating system with a portion of the water storage tank wall removed.

Referring to FIG. 4, the number 50 designates another embodiment of the combined water heating system. The water heater system 50 has a heat source 52 and a glass-lined water storage tank 54. The water storage tank 54 has a bottom 56, a top 58 and a wall 66. The top 58 of the water heater system 50 has a hot water outlet port 60 as well as a cold water inlet port (not shown). The top 58 of the water heating system 50 also has a tank inlet port 62 and tank outlet port 64. A flue 68 extends between the tank bottom 56 and the tank top 58 to exhaust combustion gases from the heat source 52. A coiled heat exchange tube 70 surrounds the flue 68, terminating at a dielectric fitting assembly 72 located at the tank outlet port 64 and also terminating at a dielectric fitting assembly 72 located at the tank inlet port 62.

In this embodiment of the invention, the coiled heat exchange tube 70 enters and exits the water storage tank 54 through the water storage tank top 58. Piping 74 extends from a space heating system and terminates at the dielectric fitting assembly 72 at the tank inlet port 62. Piping 76 runs from the dielectric fitting 72 located at the tank outlet port 64, and travels to the space heating system.

Figure 6:
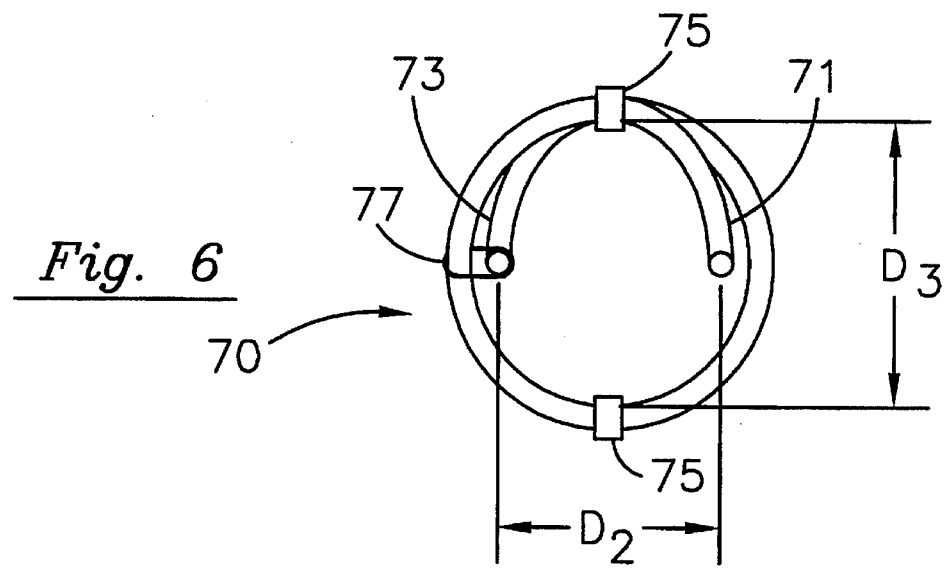
FIG. 6 shows a top view of the coiled heat exchange tube used in the combined water heating system shown in FIG. 4.

Two coil spacing brackets 75, 75 are preferably used to engage coiled heat exchange tube 70. Coil spacing brackets 75, ideally mounted 180° apart as shown in FIG. 6, provide support for coiled heat exchange tube 70 during shipping, handling and operation of combined water heating system 50. Coil spacing brackets 75 also maintain spacing between adjacent coils of tube 70 and reduce or eliminate any noise caused by coil vibration. Coil spacing brackets 75 also maximize heat transfer surface area by preventing contact between adjacent coils. Another benefit of coil spacing brackets 75 is improved water circulation between adjacent coils, thereby decreasing stratification by permitting horizontal water flow during water heater operation. Also, brackets 75 increase coil rigidity to assist in the tank manufacturing process.

While two coil spacing brackets 75 are shown, the use of one, three or more coil spacing brackets 75 is contemplated. Details of coil spacing brackets 75 are provided hereinafter with reference to FIG. 11.

Figure 11:
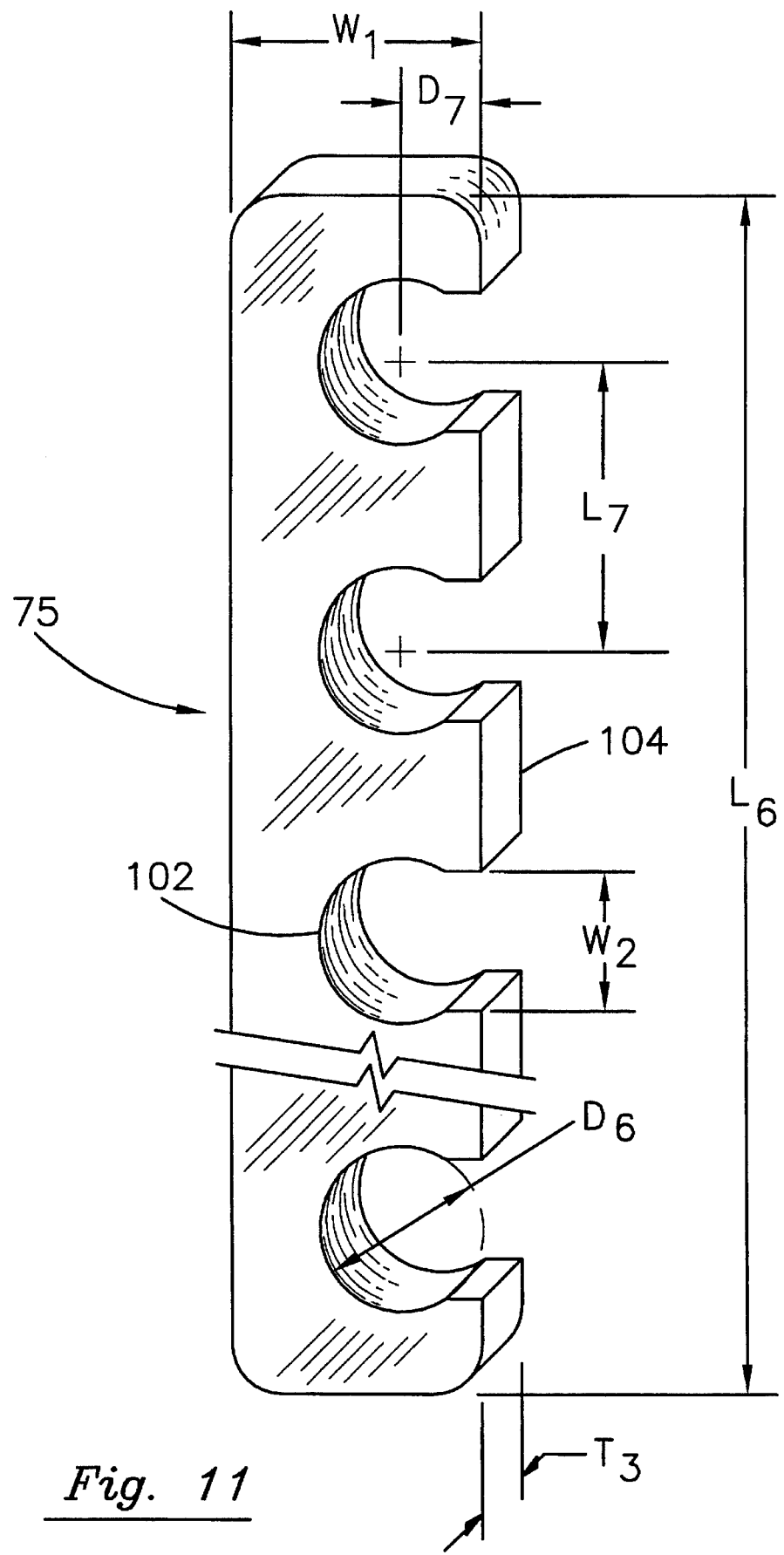
FIG. 11 shows a perspective view of the coil spacing bracket used in the combined water heating system shown in FIG. 4.

Referring to FIG. 11, coil spacing bracket 75 preferably has an overall length $L_6$ of approximately 21.38 inches, a width $W_1$ of approximately 1.00 inches, and a thickness $T_3$ of approximately 0.18 inches but other dimensions may be used. Coil spacing bracket 75 has coil engaging notches 102 separated and defined by spacers 104. The number of coil engaging notches 102 in coil spacing bracket 75 preferably matches the number of coils in heat exchange tube 70.

Coil engaging notches 102 of coil spacing bracket 75 are sized and shaped to provide snap-in engagement between bracket 75 and tube 70. For example, notches 102 of bracket 75 should have a width $W_2$ of approximately 0.650 inches and a diameter $D_6$ of approximately 0.700 inches to permit snap-in engagement of tube 70 having outside diameter $D_5$ (FIG. 7) of about 0.665 inches.

The circular portions of notches 102 preferably have centers located a distance $D_7$ of approximately 0.400 inches from the edge of bracket 75 and are separated from each other by a length $L_7$ of approximately 0.960 inches. Bracket 75 can be provided with any dimensions that permit snap-in engagement of coiled tubing 70 or any other known means of engaging bracket 75 with tubing 70. In fact, bracket 75 can even be replaced with a strap applied around the coils of tube 70 to maintain length $L_3$ (FIG. 5), utilizing the spring effect of the coils to maintain spacing between adjacent coils. Any of the foregoing dimensions may be changed to suit.

A retaining strap 77 (shown in FIGS. 4 and 6) is preferably provided to secure the top coil of tube 70 to the leg of coiled heat exchange tube 70 which runs vertically from the bottom coil to tank inlet port 62. Retaining strap 77 assures a constant dimension $D_2$ between outlet and inlet portions 71 and 73 of coil 70 (FIG. 6). Retaining strap 77 also prevents damage to coil 70 during shipment of combined water heating system 50.

Retaining strap 77 can be formed from a variety of materials and have a variety of dimensions. Preferably, retaining strap 77 is formed from nylon strip having a width of 1/8 inches and a thickness of 0.020 inches though various other dimensions may be used. Retaining strap 77 is preferably attached as shown in FIG. 6, but can be applied in any manner to reduce relative movement between the vertically running leg, upper coils and outlet and inlet portions of tube 70.

Figure 5:
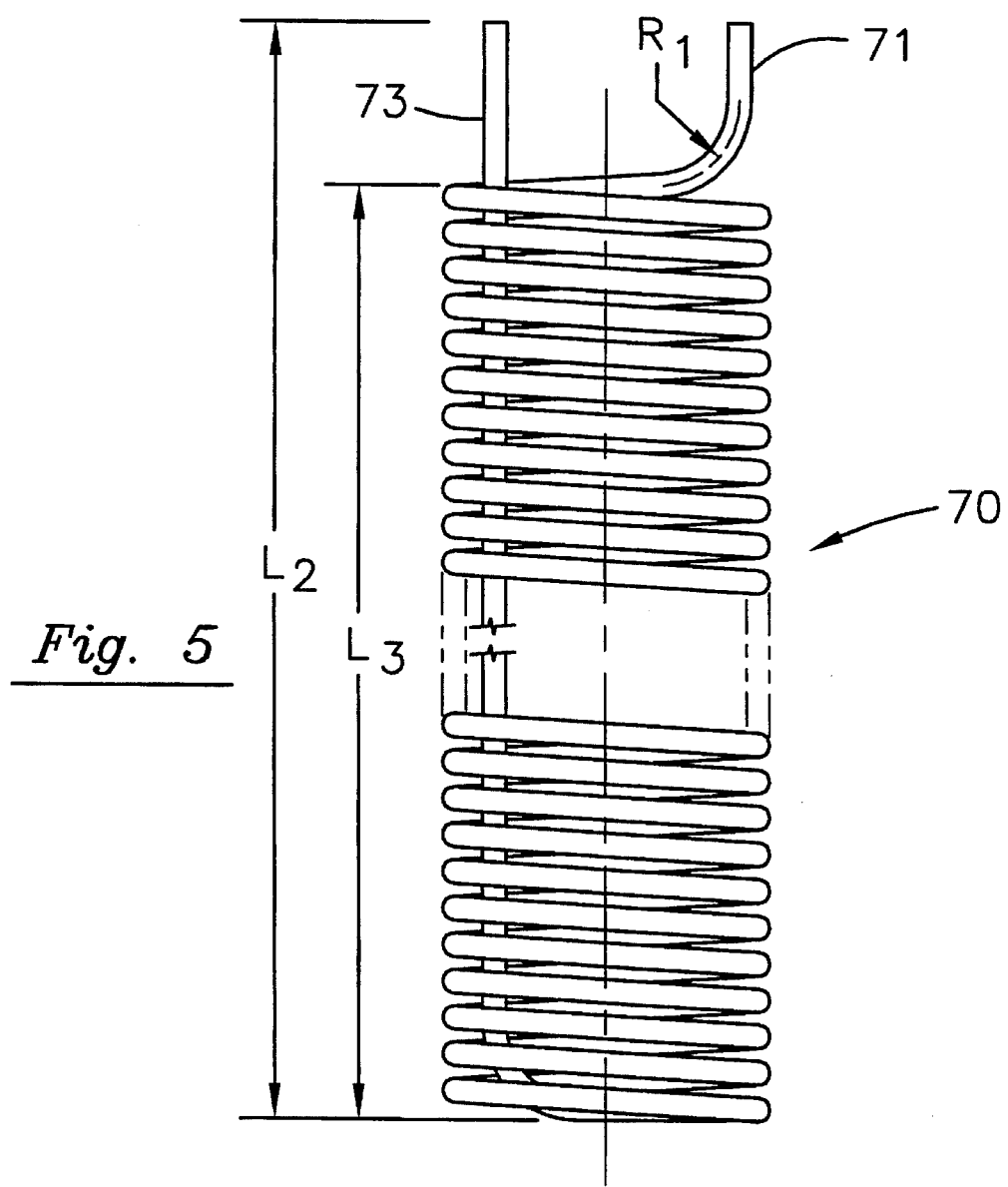
FIG. 5 shows a side view of the coiled heat exchange tube used in the combined water heating system shown in FIG. 4.

Referring to FIG. 5, the coiled heat exchange tube 70 has an overall length $L_2$ and a coiled length $L_3$. The overall length $L_2$ is preferably about 34.5 inches, and the coiled length $L_3$ is preferably about 25.5 inches. A bend radius $R_1$ is provided near the outlet portion 71 of the coiled heat exchange tube 70 and at the bottom of the inlet portion 73 of the coil 70. The bend radius $R_1$ is preferably about 3 inches.

Referring to FIG. 6, the distance $D_2$ between the centerlines of the outlet and inlet portions 71 and 73 of the coil 70 is preferably about 11 inches. The coil inner diameter $D_3$ is preferably about 12.25 inches so that the flue 68 in the water heating system 50 shown in FIG. 4 can easily fit within the coiled heat exchange tube 70. For example, a flue 68 having an outside diameter of about 5 inches can easily fit within the coiled heat exchange tube 70. With the preferred dimensions provided above, the heat exchange tube will have an overall length of approximately 80 feet, and the coiled heat exchange tube 70 will have approximately 22.5 coils within the coiled length $L_3$. This overall heat exchange tube length provides sufficient tube surface area for adequate heat transfer between water in the water storage tank 54 and water within the coiled heat exchange tube 70.

FIG. 7 illustrates the preferred double-wall construction of the coiled heat exchange tube 70. The heat exchange tube 70 has a tubing inner wall 78 having an inner wall thickness $T_1$ and an inner wall outside diameter $D_4$. The tubing inner wall 78 is preferably formed from a soft metallic material such as copper or aluminum so that the coiled heat exchange tube 70 is provided with a means for support to prevent kinking while being soft enough to permit the formation of the coiled heat exchange tube 70 shown in FIG. 5. The metallic tubing inner wall 78 also provides conductive heat transfer to increase the output of the combined water heating system 50. The tubing inner wall 78 preferably has a thickness $T_1$ of about 0.035 inches and an outside diameter $D_4$ of about 0.625 inches. The tubing outer wall 80 fits snugly over the tubing inner wall 78 and has an outer wall thickness $T_2$ and an outside diameter $D_5$. The tubing outer wall 80 is preferably formed from a non-metallic material such as high density polyethylene and may take the form of a co-extruded coating. The tubing outer wall 80 preferably has a thickness $T_2$ of approximately 0.020 inches, and the outside diameter $D_5$ of the tubing outer wall is preferably about 0.665 inches.

Figure 10:
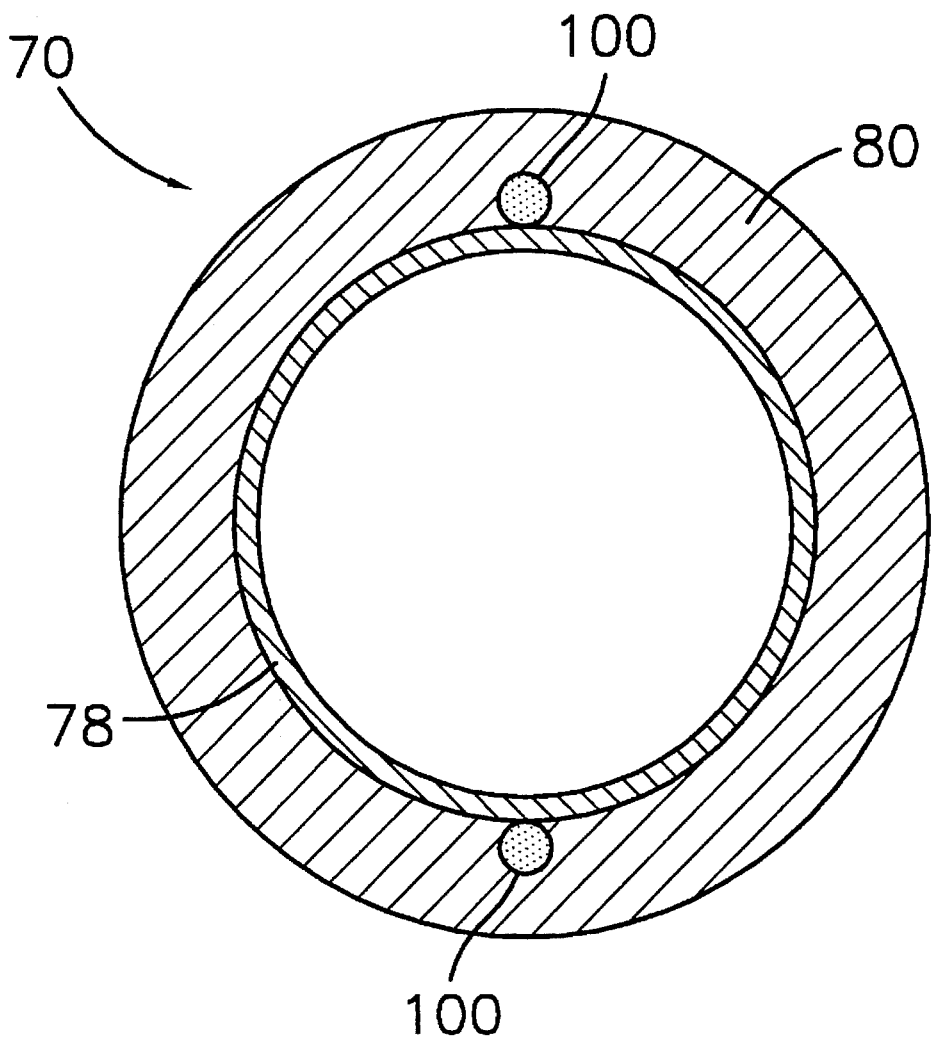
FIG. 10 shows a cross-sectional view of the coiled heat exchange tube as indicated in FIG. 7, illustrating a preferred double-wall construction.

FIG. 10 illustrates additional preferred features of heat exchange tube 70. Two monofilaments 100 are preferably placed between the tubing inner and outer walls 78 and 80 of the heat exchange tubing 70. Monofilaments 100 provide an improved path along which potable or non-potable water trapped between inner and outer walls 78 and 80 can travel out of the system. Monofilaments 100 can be applied axially or spirally to provide an axial or spiral water passage.

As shown in FIG. 10, two monofilaments 100 are preferably extended over the full length of heat exchange tube 70 and positioned 180° apart. Monofilaments 100 are preferably nylon thread having a diameter in the range of from about 0.009 inch to about 0.011 inch. It is apparent, however, that a thread, wire, or strip of any suitable material and having any cross-sectional shape or dimension can be used in the place of nylon monofilament 100 so long as it provides an improved leak path between the inner and outer walls 78 and 80 over a substantial length of heat exchange tube 70. It is also apparent that one, three or more monofilaments 100 can be inserted either as outer wall 80 is extruded over inner wall 78 or by some other method, depending of course on how heat exchange tube 70 is formed.

Figure 8:
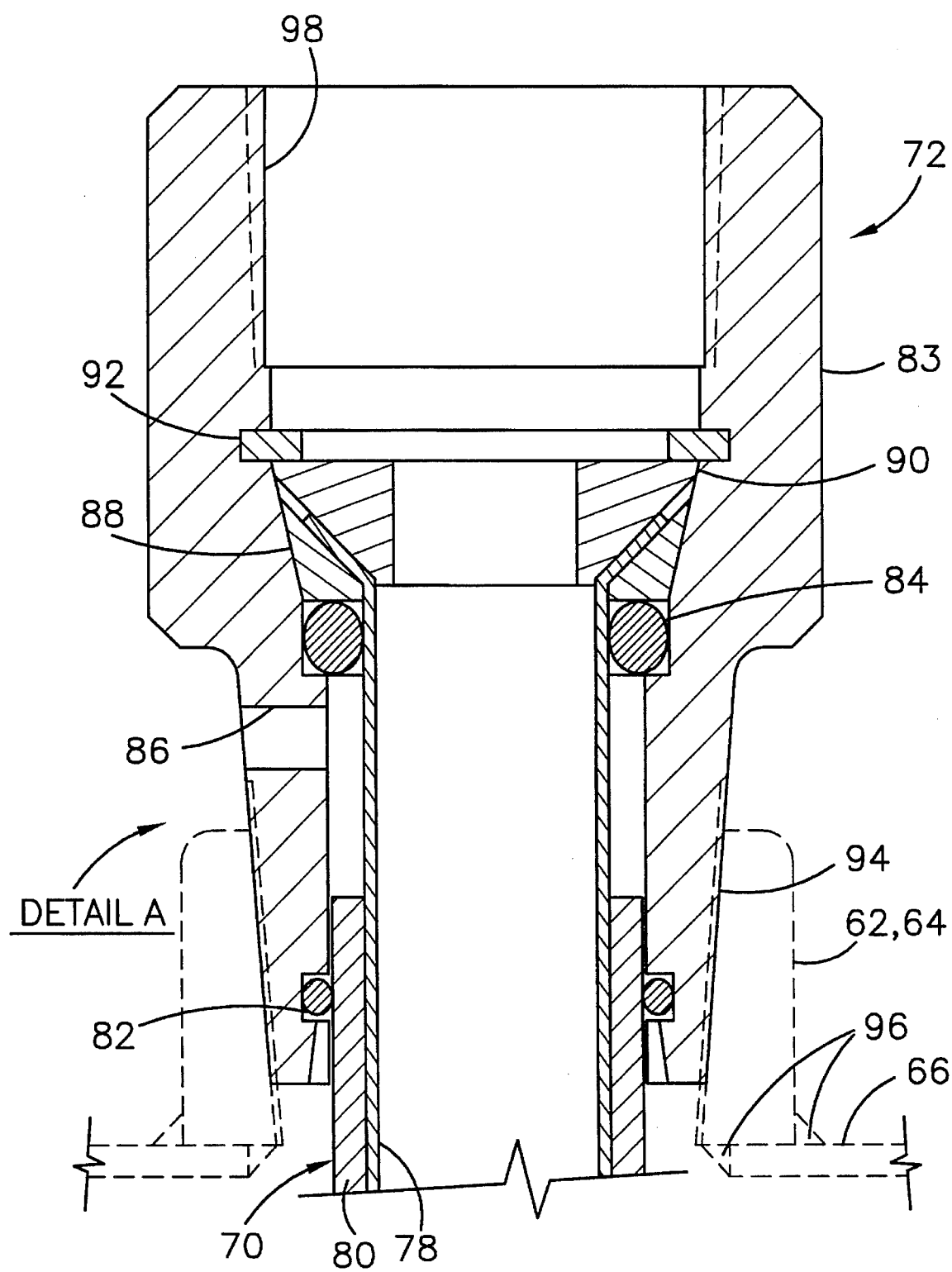
FIG. 8 shows a cross-sectional side view of the dielectric fitting assembly indicated by "Detail A" in FIG. 4, illustrating the termination and mounting of the coiled heat exchange tube.

FIG. 8 provides a cross-sectional view of Detail "A" of the combined water heating system 50 shown in FIG. 4. The dielectric fitting assembly 72 provides a termination for the heat exchange tube 70 at both the tank inlet port 62 and tank outlet port 64 in the water storage tank top 58 shown in FIG. 4. The dielectric fitting assembly 72 provides a structural mounting for the coiled heat exchange tube 70 while maintaining isolation between the tube inner wall 78 and the wall 66 of the water storage tank 54. An O-ring 82 captured within a groove in the steel fitting 83 provides a seal against the outside surface of the outer wall 80 of the heat exchange tube 70. A second O-ring 84, also captured within the steel fitting 83, creates a seal around the outside surface of the inner wall 78 of the heat exchange tube 70. A relief hole 86 positioned between the first O-ring 82 and the second O-ring 84 provides a path for the escape of potable or non-potable water that may build-up in the annular region between the inner wall 78 of the heat exchange tube 70 and the inner surface of the steel fitting 83. The relief hole 86 will also provide an escape for potable or non-potable water that travels along the passageway formed by the optional monofilaments 100 captured between the tubing inner and outer walls 78 and 80 (FIG. 10).

The dielectric fitting assembly 72 is preferably capable of sealing against hydrostatic pressures approaching and even exceeding 300 psi. If both the inner and outer walls 78 and 80 of the tube 70 leak, the pressure within the water storage tank 54 will force potable water into the tube and will prevent the leakage of non-potable water into the water storage tank 54, thereby preventing the contamination of the potable water supply.

In order to prevent axial movement of the heat exchange tube 70 within the steel fitting 83, there are provided two plastic spacers which capture the inner wall 78 of the heat exchange tube 70. A first plastic spacer 88 forms an upper end of a groove in which the second O-ring 84 is seated. The first plastic spacer 88 also prevents movement of the heat exchange tube 70 into the water storage tank 54. A second plastic spacer 90 is positioned to prevent the axial movement of the heat exchange tube 70 outward from the water storage tank 54. The exposed end of the inner wall 78 of the heat exchange tube 70 terminates in a position remote from the inner surface of the steel fitting 83 so as to maintain dielectric isolation. A retaining ring 92 is positioned within a groove in the steel fitting 83 in such a way as to capture the first and second plastic spacers 88 and 90.

Male pipe threads 94 on the steel fitting 83 are provided to permit sealing engagement with the tank inlet and outlet ports 62 and 64, indicated with phantom lines in FIG. 8. The tank inlet and outlet ports 62 and 64 are attached to the wall 66 of the water storage tank 54 by means of welds 96. Female pipe threads 98 are provided at the opposite end of the steel fitting 83 to provide for sealing connection with piping components which lead to and from a space heating system so that water within the space heating system can be circulated to and from the water heating system 50.

O-rings 82 and 84 are preferably formed from E.P.D.M. having a durometer of approximately 70. However, O-rings 82 and 84 can be any material capable of providing a pressure seal while withstanding the elevated temperatures generated in water heaters. In fact, O-rings 82 and 84 can be replaced with any known sealing means. First and second plastic spacers 88 and 90 are preferably formed from acetal copolymer, but may be formed from any other known electrically insulating material.

Figure 9:
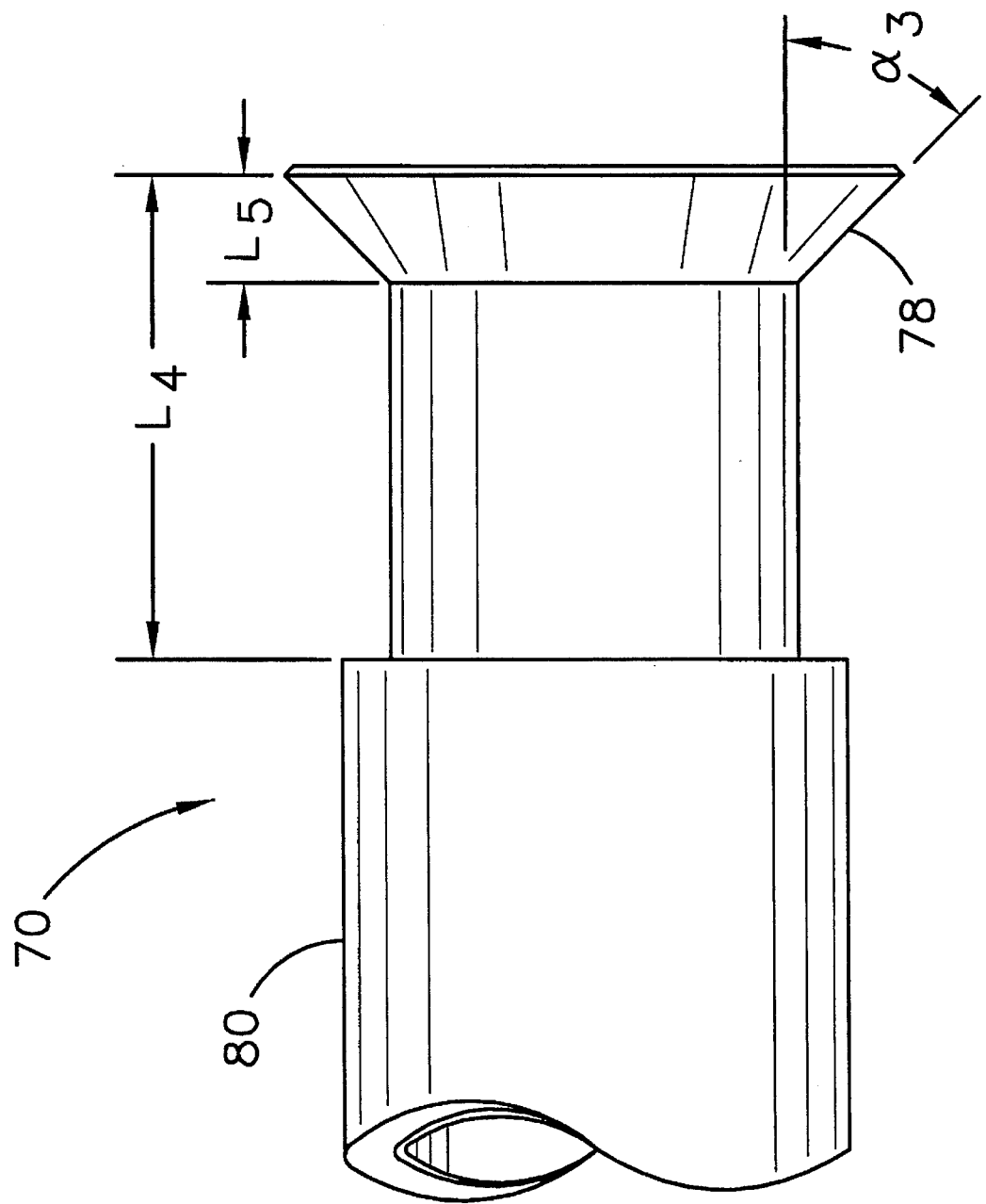
FIG. 9 shows a side view of one end of the coiled heat exchange tube, illustrating the preparation of the coiled heat exchange tube for mounting in the dielectric fitting assembly shown in FIG. 8.

FIG. 9 illustrates the manner in which the ends of the heat exchange tube 70 are prepared for mounting within the dielectric fitting assembly 72 shown in FIG. 8. So that a seal can be made against each of the inner and outer walls 78 and 80 of the heat exchange tube 70, the outer wall 80 is stripped from the inner wall 78 for a length $L_4$. This strip length $L_4$ is preferably about 1 inch.

In order to allow for the mounting of the heat exchange tube 70 within the dielectric fitting assembly shown in FIG. 8, the end portion of the inner wall 78 must be flared so that the first and second plastic spacers 88 and 90 can capture the inner wall 78 to prevent axial movement. O-rings 82 and 84 are preferably installed over inner and outer walls 78 and 80 before inner wall 78 is flared. The inner wall 78 is flared over a length $L_5$ and at an angle $\alpha_3$. The flare length $L_5$ is preferably about 0.296 inches, and the angle $\alpha_3$ is preferably greater than about 45°.

Monofilaments 100 (not shown) are preferably trimmed flush with the trimmed edge of stripped outer wall 80. Monofilaments 100 may, however, extend beyond stripped outer wall 80 and into the annular space below O-ring 84 (FIG. 8).

Figure 12:
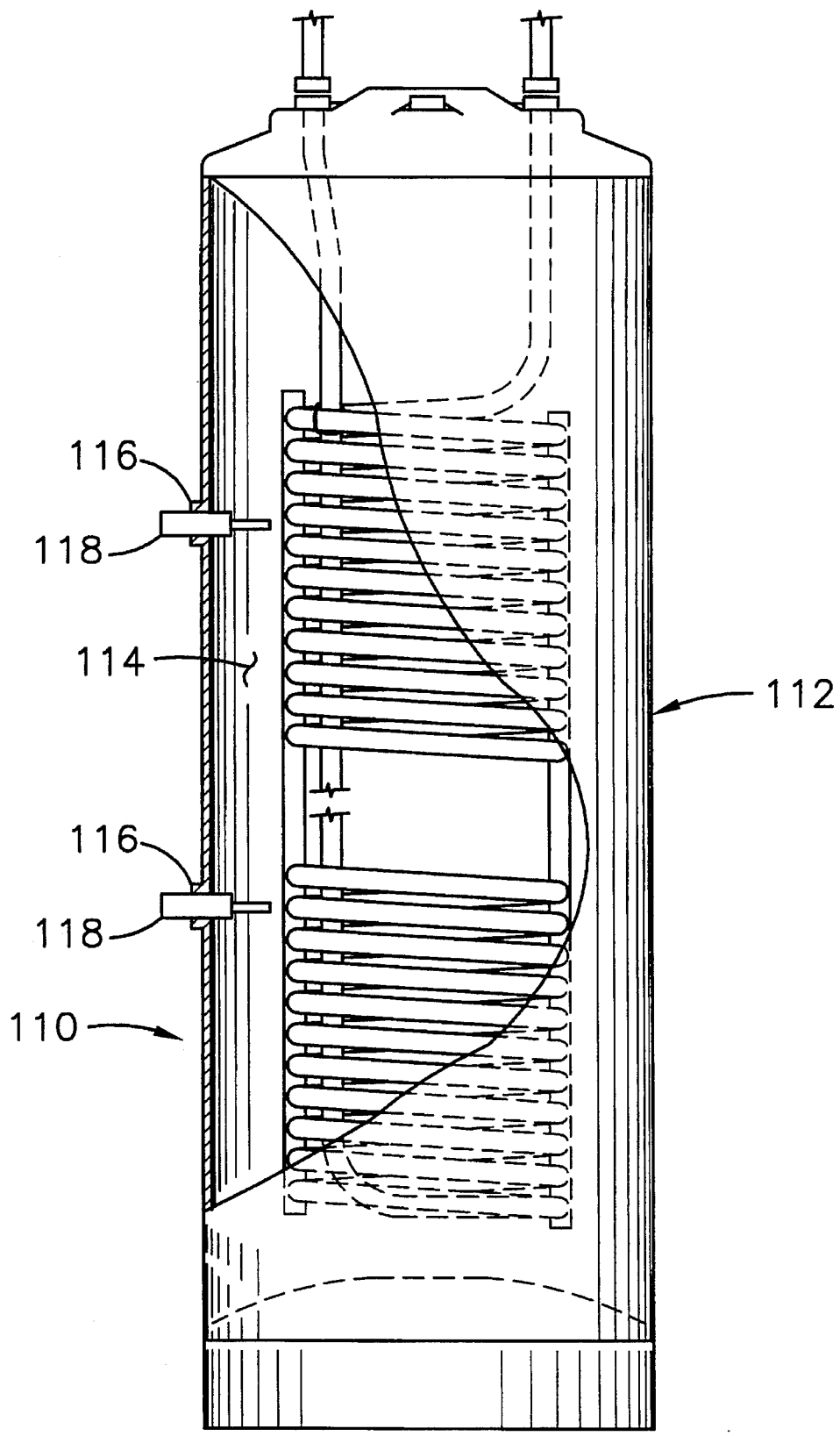
FIG. 12 shows a side view of yet another embodiment of the combined water heating system with a portion of the water storage tank wall removed.

Referring to FIG. 12, the number 110 designates yet another embodiment of the combined heating system. The water heating system 110 is similar to water heating system 50 (FIG. 4) except that system 110 utilizes electric heating rather than direct-fired heating. Water heating system 110 has a glass-lined storage tank 112 with a wall 114.

Ports 116,116 in wall 114 are provided for mounting of electric water heating elements 118,118. Although heating elements 118,118 are shown at ports 116,116 in wall 114, ports 116, 116 and elements 118, 118 can be located at any other surface or combination of surfaces of tank 112. Similarly, any number of heating elements 118 can be provided, depending on the location of the heating elements 118 and the required heat supply.

Referring to FIGS. 1 and 4, the operation of the combined heating systems 10 and 50 will now be described. It is important to note that, although water is preferably circulated through the space heating circuit, any fluid can be used. In the embodiment of the combined water heating system shown in FIG. 1, water from a spaced heating system enters the combined water heating system 10 through piping 38, a dielectric fitting assembly 34, and an inlet port 28. The water travels upwardly through the coiled heat exchange tube 32 aided by convection currents as it is heated by exposure to hot water within the water storage tank 14 and/or the flue 30. The water then exits the water storage tank 14 through an outlet port 26 and a dielectric fitting assembly 34 and travels to the space heating system through piping 36. This water is continuously circulated through the combined water Mating system 10 and space heating system as needed. The circulating water or fluid can optionally enter through port 26 and exit through port 28.

Referring to FIG. 4, the combined water heating system 50 has a coiled heat exchange tube 70 which terminates at tank inlet and outlet ports 62 and 64 located in the top 58 of the water storage tank 54. The ends of the coiled heat exchange tube 70 are fixedly mounted in dielectric fitting assemblies 72. Water from a space heating system enters the combined water heating system 50 through piping 74, dielectric fitting assembly 72, and inlet port 62. The water travels downwardly toward the bottom 56 of the water storage tank 54 and then travels upwardly through the coiled heat exchange tube 70 aided by convection currents. The water is heated by exposure to hot water within the water storage tank 54 and/or the flue 68. The heated water then exits through the top 58 of the water storage tank 54 by passing through a dielectric fitting assembly 72 mounted at the tank outlet port 64. The water then travels towards the space heating system through piping 76. The vertical leg of the heat exchange tube 70 which extends from the tank inlet port 62 travels downwardly between the flue 68 and the coils of the heat exchange tube In any embodiment, the combined water heating system according to this invention confers many significant benefits. First, the combined water heating system provides a compact, economical, and durable appliance for use in both residential and commercial applications. The combined water heating system simultaneously provides hot potable water for consumption as well as heated water for use in radiant hot-water heating systems, forced hot-air heating systems, or other heating systems utilizing heated fluids. The combined water heating system can be provided with standard glass-lined water heaters without compromising the longevity of the water heaters.

Also, the transfer of heat from potable water within the water storage tank to non-potable water circulated through a radiant heating system provides increased energy efficiency. Because space heating needs are sporadic and seasonal, constant heat transfer is not required. In a reversed system, heat transfer would have to be constant to meet hot potable water needs.

The dual heating capability of the water heating system is made possible by using a heat exchange tube having a double-wall construction. The outer wall of the coiled heat exchange tube when mounted in a dielectric fitting provides dielectric isolation, thereby preventing the accelerated corrosion associated with the exposure of dissimilar metals to water within water storage tanks. The inner wall is formed from a soft metallic material which provides strength and structure to the coiled heat exchange tube while providing for improved heat exchange and increased conductivity for improved heat exchange and malleability to facilitate coil formation.

The combined water heating system confers these benefits in any embodiment, and various modifications to the overall system or its various components can be made without reaching beyond the scope of this invention. For example, the tank inlet and outlet ports at which the coiled heat exchange tube terminates can be formed in the wall of a glass-lined water storage tank, in the top of a water storage tank, through the bottom of the water storage tank, or in any combination of the water storage tank surfaces. Water may enter the coiled heat exchange tube near the top of the water storage tank instead of near the bottom. The combined water heating system can be used in a water heater using a direct-firing burner or in an electric water heater without a flue, and the number of coils formed in the coiled heat exchange tube may be varied depending on the type of water heater and the load demands of the space heating system.

The double-wall heat exchange tube is preferably formed with a nonmetallic coating such as high density polyethylene, but can be formed from many other materials, including but not limited to polyethylene and polypropylene. The outer wall may optionally be co-extruded over the inner wall so as to maintain a uniform fit between the heat exchange tube's outer and inner walls. The outer wall may optionally be applied by employing materials such as heat shrink tubing. The outer wall may also be applied by means of a heat fit process wherein the outer wall is heated to cause its expansion, and the inner wall is placed within the outer wall so that, when the outer wall cools and contracts, there remains a close fit between the inner and outer walls. No matter how the outer wall is applied to the inner wall, it is preferable that a path remains between the walls to permit the drainage of trapped water. To ensure that such a path remains between the walls, one or more monofilaments, strips or wires may optionally be inserted in an axial, spiral or some other orientation between the walls. The inner wall is preferably formed from a malleable metallic material such as aluminum or copper, but may optionally be formed from any other suitable material, including but not limited to carbon and stainless steel.

The dimensions of the coiled heat exchange tube may vary depending on practical considerations or the load requirements of the space heating system. For example, an increase in the diameter of the coiled heat exchange tube will increase the surface area over which heat exchange may occur, thereby increasing the output of the system. Similarly, the wall thickness of the inner and outer walls can be increased or decreased to facilitate the co-extrusion and coiling processes, and when a nonmetallic, nonconductive material is used to form the outer wall, the thickness of the outer wall may be reduced to decrease its insulative effect. The thickness of the inner wall must be sufficient to avoid kinking of the heat exchange tube during the coiling process, and must be suitable to maintain the shape of a finally coiled heat exchange tube.

The dielectric fitting assembly may be structured in any way capable of maintaining dielectric isolation between the metallic inner wall of the heat exchange tube and the inside surface of the steel fitting, and the heat exchange tube can be mounted within the dielectric fitting assembly in any way which prevents substantial axial movement of the heat exchange tube within the dielectric fitting assembly. A plastic fitting may optionally be used to provide dielectric isolation between the metallic inner wall of the heat exchange tube and the inlet and outlet ports in the water storage tank.

These and other modifications to the combined water heating system can be made without exceeding the scope and spirit of this invention. The scope of this invention is separately defined in the following claims.

What is claim is:

1. A system for heating a domestic water supply and a separate recirculating fluid supply for recirculation to a heating system, said heating system comprising:

a water storage tank adapted to contain said domestic water supply, said water storage tank having a top, a bottom, and a wall;

a heat source positioned to heat said domestic water supply within said water storage tank;

a tube connected to contain said recirculating fluid supply, said tube being mounted within said water storage tank in communication with the exterior of said water storage tank, said tube having a double-wall construction with a non-metallic outer wall in contact with a metallic inner wall, said double-wall preventing the mixing of said domestic water and said recirculating fluid; and a means for sealing between said tube and said tank and preventing the mixing of said domestic water supply and said recirculating fluid supply.

2. The heating system described in claim 1, wherein said inner metallic wall is formed from a material selected from the group consisting of aluminum, copper, stainless steel, and carbon steel.

3. The heating system described in claim 1, wherein said outer non-metallic wall is formed from a material selected from the group consisting of polyethylene, polypropylene, and high density polyethylene.

4. The heating system described in claim 1, wherein said heat source is at least one electrical heating element mounted in heat transfer relationship with said domestic water supply.

5. The heating system described in claim 1, wherein said heat source is a burner and said water storage tank has a flue within said tank and extending into the space between said top and said bottom of said water storage tank.

6. The heating system described in claim 5, wherein said tube is coiled about said flue.

7. The heating system described in claim 1, wherein said tube terminates at said wall of said water storage tank.

8. The heating system described in claim 1, wherein said tube terminates in said top of said water storage tank.

9. The heating system described in claim 1, wherein said recirculating fluid supply is recirculating water.

10. A combined water heating system for the simultaneous heating of a separate domestic water supply used for consumption and a separate recirculating water supply used for space heating in a recirculating heating system, said combined water heating system comprising:

a lined water storage tank having a top surface, a bottom surface, a wall, and a flue within said tank and extending into the space between said top and bottom surfaces, said water storage tank being adapted to contain said domestic water supply;

a burner positioned for heating said domestic water supply within said water storage tank;

a coiled, double-wall heat exchange tube mounted within said water storage tank and connected to contain and conduct said recirculating water, said coiled tube being mounted proximal to said flue within said water storage tank in communication with the exterior of said water storage tank, said double-wall tube having an outer wall which is non-metallic, and said double-wall tube having an inner wall which is metallic, said outer wall being in contact with said inner wall, said double-wall tube being sealed against the mixing of said domestic and said recirculating water; and a dielectric fitting assembly connected to said double-wall heat exchange tube and to said tank and adapted to create a seal between said double-wall tube and said water storage tank to prevent the mixing of said domestic and said recirculating water while maintaining dielectric isolation between said inner wall of said double-wall tube and said water storage tank.

11. The combined water heating system described in claim 10, wherein said inner wall of said double-wall tube is formed from a material selected from the group consisting of aluminum, copper, stainless steel and carbon steel.

12. The combined water heating system described in claim 10, wherein said outer wall of said double-wall tube is formed from a material selected from the group consisting of polyethylene, polypropylene, and high density polyethylene.

13. The combined water heating system described in claim 10, wherein said double-wall tube terminates at said wall of said water storage tank.

14. The combined water heating system described in claim 10, wherein said double-wall tube terminates at said top of said water storage tank.

15. The combined water heating system described in claim 10, wherein said inner wall of said double-wall tube has an outside diameter of about 0.625 inches and a wall thickness of about 0.035 inches, and said outer wall of said double-wall tube has an outside diameter of about 0.665 inches and a wall thickness of about 0.020 inches.

16. The combined water heating system described in claim 15, wherein said coiled double-wall heat exchange tube has about 22.5 coils and an overall length of about 80 feet.

17. The water heater system described in claim 1, wherein at least one elongated member is captured between said non-metallic outer wall and said metallic inner wall to form a path along which any of said domestic water that may leak through said outer wall, and any of said recirculating fluid that may leak through said inner wall, can travel out of said water storage tank.

18. The water heater system described in claim 17, wherein said at least one elongated member is a nylon monofilament.

19. The water heater system described in claim 10, wherein at least one elongated member is captured between said non-metallic outer wall and said metallic inner wall to form a path along which any of said domestic water that may leak through said outer wall, and any of said recirculating water that may leak through said inner wall, can travel out of said water storage tank.

20. The water heater system described in claim 19, wherein said at least one elongated member is a nylon monofilament.

21. The heating system described in claim 1, further comprising a support member contacting coils of said tube and attached to reduce relative movement of said coils.

22. The water heating system described in claim 21, wherein said support member is a coil spacing bracket shaped for snap-on attachment to said coils.

23. The water heating system described in claim 10, further comprising a coil spacing bracket shaped for snap-on attachment to said coils attached to reduce relative movement of said coils.

24. A system for heating a domestic water supply and a separate recirculating fluid supply connected for transferring heat into a space heater, said system comprising:

a glass lined storage tank adapted to contain said domestic water supply;

a heat source positioned to heat said domestic water supply within said storage tank;

a recirculating tube connected to contain said recirculating fluid supply, a portion of said recirculating tube being mounted for receiving heat from the water located within said storage tank, said recirculating tube in said storage tank being connected to deliver heat to a portion of said recirculating tube outside said storage tank, said portion of said tube within said storage tank having a double-wall with a non-metallic outer wall in contact with a metallic inner wall, said double-wall preventing mixing of said domestic water supply and said recirculating fluid supply; and a means for sealing between said recirculating tube and said storage tank and preventing mixing of said domestic water supply and said recirculating fluid supply.

* * * * *